United States Patent [19]

Laurent et al.

[11] Patent Number: 4,603,393
[45] Date of Patent: Jul. 29, 1986

[54] DEMODULATOR FOR CONSTANT ENVELOPE AND CONTINUOUS PHASE SIGNALS WHICH ARE ANGLE MODULATED BY A TRAIN OF BINARY SYMBOLS

[75] Inventors: Pierre Laurent, Le Chesnay; Hervé Ganem, St Ouen, both of France

[73] Assignee: THOMSON-CSF, Paris, France

[21] Appl. No.: 607,505

[22] Filed: May 7, 1984

[30] Foreign Application Priority Data

May 10, 1983 [FR] France ............................ 83 07798

[51] Int. Cl.$^4$ ........................ H04L 27/10; H04B 1/10; H03D 3/22
[52] U.S. Cl. ...................................... 364/481; 375/86; 329/137
[58] Field of Search ................. 364/481, 300; 375/82, 375/84, 86, 102; 329/105, 137, 118, 136

[56] References Cited

U.S. PATENT DOCUMENTS

| 4,079,330 | 3/1978 | Ishigaki et al. | 329/137 X |
| 4,087,752 | 5/1978 | Melvin | 325/30 |
| 4,191,926 | 3/1980 | Pontano et al. | 329/137 X |
| 4,246,654 | 1/1981 | Malm | 375/82 |
| 4,510,453 | 4/1985 | Sun | 375/82 X |

OTHER PUBLICATIONS

International Conference on Communications, vol. 3, 10–14, Jun. 1979, Boston, New York (US); T. Aulin et al.: "Bandwidth Efficient Digital FM with Coherent Phase Tree Demodulation", pp. 42.4.1–42.4.6.

Primary Examiner—Edward J. Wise
Attorney, Agent, or Firm—Oblon, Fisher, Spivak, McClelland & Maier

[57] ABSTRACT

The demodulator is for use with an angle modulated signal conveying a sequence of binary symbols. The signal is modulated at constant envelope and with continuous phase and may be treated as a sequence of elementary pulses that have been amplitude modulated using a principal function $F_p(t)$ derived from the frequency pulse characteristic of the modulation. The demodulator comprises two filters matched to the principle function and connected to receive quadrature components constituting the complex envelope of the received signal. The filters are followed by samplers. A calculating circuit operating at the bit rate calculates metric increments on the basis of P stored complex samples and transmits the increments to a decision circuit which performs a dynamic programming algorithm to determine the values of the bits in the sequence recursively.

3 Claims, 6 Drawing Figures

DEMODULATOR FOR CONSTANT ENVELOPE AND CONTINUOUS PHASE SIGNALS WHICH ARE ANGLE MODULATED BY A TRAIN OF BINARY SYMBOLS

BACKGROUND OF THE INVENTION

1. Field of the Invention

The invention relates to demodulating signals which convey binary data by angle modulation of a carrier, and it relates more particularly to a demodulator for constant envelope and continuous phase signals which have been angle modulated by a train of binary symbols.

Constant envelope modulation schemes are widely used at present in radio communications because of their immunity to non-linear amplitude distortion. Of such modulation schemes, those in which the phase variation takes place exclusively during the transmission period for one bit (total response modulation schemes) occupy a wide spectrum and thus limit the number of channels that can be transmitted over a given bandwidth. Conversely, continuous phase modulation in which the phase variation due to any one bit is spread over a plurality of bit periods (partial response modulation) has advantageous properties of considerably reduced spectrum occupation.

2. Description of the Prior Art

Demodulation is conventionally performed either by means of a coherent demodulator having a reference phase, or else by means of a non-coherent demodulator which may be of the differential type.

At any given instant, a coherent demodulator gives a value representative of the frequency or of the phase of a signal relative to the corresponding quantity of a reference oscillator. To do this, a coherent demodulator is associated with a phase-lock loop which requires finite settling time. This can be incompatible with some types of application, e.g. in frequency hopping links. In such applications, it is difficult to obtain a satisfactory reference phase at all instants because the random phase rotation in the transmission channel varies with frequency, i.e. at each frequency hop.

Further, non-coherent demodulation of the differential type is not always suitable for demodulating signals in which the phase variation is spread over a plurality of bits because of intersymbol interference.

Preferred embodiments of the invention provide a non-coherent type demodulator, i.e. a demodulator which does not require a local reference oscillation locked to the phase of the received signal. The demodulator is fairly simple in structure, and yet it demodulates complex angle modulated signals in which the phase variation due to any one bit is spread over a period longer than one bit interval in order to reduce spectrum occupation. To do this, the demodulator does not detect data directly from the received signal itself, but from a window extending over P symbols and based on a signal related to the received signal and comprising elementary pulses which are amplitude modulated and phase shifted relative to one another. The sequence of binary digits is then established on the basis of a demodulation algorithm performed on samples taken at the bit rate from the autocorrelation signal.

SUMMARY OF THE INVENTION

The present invention provides a demodulator for constant envelope and continuous phase signals that are angle modulated by a train of binary symbols, wherein the complex envelope of the received signal is treated as a sequence of elementary pulses which are amplitude modulated by a "principal function" $F_p(t)$ and which are regularly phase shifted relative to one another, the principal function being associated with the pulse $g(t)$ characteristic of the modulation used for transmission, the demodulator comprising a $\pi/2$ phase shifting coupler for decomposing the complex envelope of the received signal into two components in quadrature, the input to the coupler being connected to receive the received signal at an intermediate frequency and each of the outputs from the coupler being connected to a respective mixer for translating the received signal components to base band, the improvement wherein the demodulator further comprises two filters both of which are matched to the principal function $F_p(t)$ and each of which is connected to the output from a respective one of the mixers, the outputs from the filters being connected to respective samplers having outputs connected to the inputs of respective shift memories having $P+1$ stages each, said memories storing the real and the imaginary parts respectively of $P+1$ consecutive complex samples which are shifted at the data bit clock rate $T$, the outputs from the $(P+1)$ stages of each of the memories being connected to $2(P+1)$ inputs of a calculation circuit for calculating branch metrics which are associated, at each clock pulse, with each of the $2^{P+1}$ possible sequences of $(P+1)$ bits, and a decision circuit connected to the outputs from the calculation circuit to perform a dynamic programming algorithm to decide at each clock pulse on the value of a binary digit by seeking the path for which the sum of the corresponding branch metrics is a maximum.

BRIEF DESCRIPTION OF THE DRAWINGS

An embodiment of the invention is described by way of example with reference to the accompanying drawings, in which.

DESCRIPTION OF A PREFERRED EMBODIMENT

Figure 1:
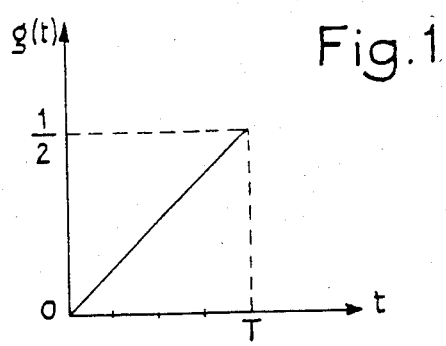
FIGS. 1 and 2 are respective graphs of the frequency pulse $g(t)$ and the principal function $F_p(t)$ characteristic of MSK modulation.

Minimum Shift Keying (MSK) is a simple and well known example of continuous phase modulation. It is a form of frequency modulation in which phase variation is linear using a modulation index equal to ½, and in which modulation representative of any given bit takes place over a single bit period. This form of modulation is equivalent to amplitude modulation of two carriers in quadrature, and this well-known representation has made it possible to provide MSK modulators and demodulators relatively simply.

In practice, as indicated above, other types of continuous phase and constant envelope modulation can be of interest, and in particular those types of modulation in which:

the form of the phase variation may be more complex;

the modulation index may be other than ½; and the duration of phase rotation characteristic of the type of modulation is greater than the bit period T (partial response modulation schemes).

Calculation set out in the present assignee's French patent application No. 83 04982 shows that all signals which are modulated by a constant envelope and continuous phase modulation scheme may be expressed in the form of a super-position of amplitude modulated pulses which are time and phase shifted relative to one another. Further, in the commonly encountered cases, most of the signal energy is concentrated in a series of pulses which are described by a "principal function". This fundamental observation means that a close approximation of the characteristics of the modulated signal may be obtained by considering the said "principal function" only, thereby considerably simplifying the circuits.

For given modulation index h, e.g. $h=\frac{1}{2}$, and a series of modulating bits $a=\{a_n\}$ for $n=0$ to infinity, the phase variation due to the n-th bit is such that:

$$\Delta\phi_n(t) = a_n \phi(t - nT), \quad t \in [0, LT]$$

where the phase variation $\phi(t)$ characteristic of the modulation is such that:

$$\phi(t) = 2\pi h \int_{-\infty}^{t} g(\theta) d\theta$$

In this expression, $\theta$ is the integration variable, h is the modulation index as indicated above, and g(t) is a frequency pulse characterizing the modulation. This pulse only exists for duration LT, where T is the duration of one data bit and L is an integer, such that LT is the period over which the phase rotation due to any given data bit is spread.

This frequency pulse is normalized, such that:

$$\int_0^{LT} g(\theta) d\theta = \frac{1}{2}; \quad g(\theta) = 0 \text{ outside } (0, LT).$$

Thus, the complete modulated signal is represented by a complex exponential resulting from the superposition of the phase variations due to the modulating bits $a_n$, which may be written:

$$x(t,\underline{a}) = \sqrt{(2E/T)} \exp(j\phi(t,\underline{a}))$$

where E is the energy transmitted per symbol, and T is the symbol duration.

The phase variation law $\phi(t,a)$ is given by:

$$\phi(t,\underline{a}) = 2\pi h \int_{-\infty}^{+\infty} \sum_{n=-\infty}^{+\infty} a_n \cdot g(t - nT) dt$$

when the bits $a_n$ are transmitted without being encoded at the transmission end.

It is also possible to transmit the modulating bits using the following phase variation law:

$$\phi'(t,\underline{a}) = 2\pi h \int_{-\infty}^{+\infty} \sum_{n=-\infty}^{+\infty} a_{n-1} \cdot a_n \cdot g(t - nT) dt$$

This form makes obtaining the series a of bits $a_n$ at the receiving end more direct.

This is the form which is used in what follows.

In this case, calculation shows that if the modulation index $h=\frac{1}{2}$, the corresponding modulated signal: x'(t,a) may be written in the following form:

$$x'(t,\underline{a}) = \left( \sum_{n=-\infty}^{+\infty} (j)^n b_n F_p(t - nT) + E(t) \right)$$

where: E(t) is a residual function which can generally be neglected; $F_p(t)$ is a real pulse of duration (L+1)T, known as the principal function, and determined solely by the frequency pulse g(t) which is characteristic of the type of modulation; and $b_n = \pm 1$ and is defined from the transmitted symbols by: $b_n = {}^nSa_n$, where S is a sign which is fixed arbitrarily and which corresponds at the receiver end to a possible error of $\pi$ in determining the initial phase. In what follows, S is put equal to 1, and an ambiguity removing device should be provided downstream from the demodulator where necessary.

$\sum_{n=-\infty}^{+\infty} (j)^n b_n F_p(t - nT)$ is the approximate linear form of the complex envelope of the modulated signal for which the modulator is constructed.

Figure 2:
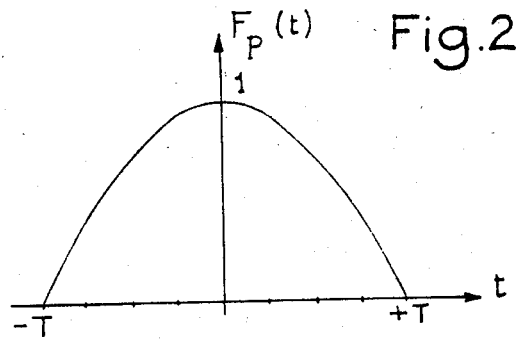

By way of example, FIGS. 1 and 2 are graphs respectively of the frequency pulse g(t) and the principal function $F_p(t)$ for MSK modulation which is continuous phase frequency modulation with a modulation index $h=\frac{1}{2}$, and in which L=1. The variation phase due to one bit is linear and extends over one period T only, which period is equal to the duration of a single bit. In this case, $g(t)=t/2T$ for $t \in (0,T)$ and g(t) is zero outside the interval (O,T), whence:

$F_p(t) = \cos(\pi t/2T)$ for $t \in (-T, +T)$ and zero otherwise.

Figure 3:
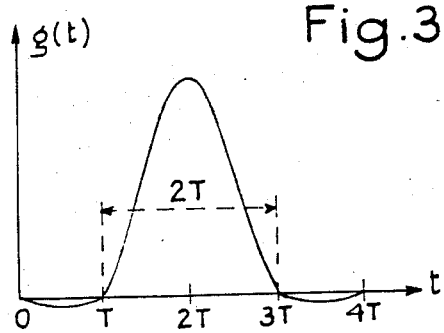
FIGS. 3 and 4 are respective graphs of the frequency pulse $g(t)$ and the principal function $F_p(t)$ characteristic of SRC-4 modulation.
Figure 4:
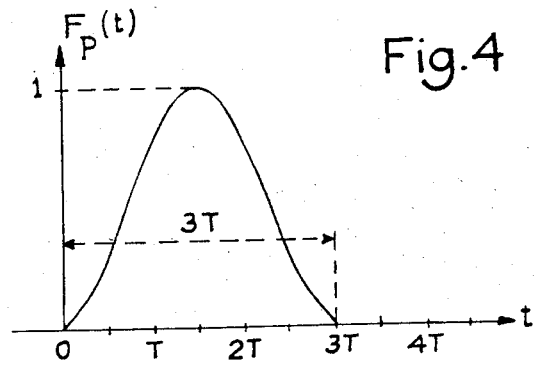

Likewise, FIGS. 3 and 4 are graphs respectively of the frequency pulse g(t) and the principal function $F_p(t)$ for a continuous pulse frequency modulation scheme with a modulation index $h=\frac{1}{2}$, and in which L=4. Phase variation is defined by the frequency pulse:

$$g(t) = \frac{k \sin \pi X}{\pi \cdot X(1 - X^2)} \text{ for } t \in (0, 4T) \text{ and } X = 2t/T - 4, \text{ and}$$

thus extending over four bit periods. This type of modulation is called SRC4 modulation (for Spectrum Raised Cosine, L=4) and was introduced at the Globecom 1982 conference at Miami by J. S. Bourgenot and H. Ganem in a paper entitled "Non coherent detection of controlled-phase modulated signals". As shown in FIG. 3, nearly all of the energy of the pulse is concentrated in the principal lobe which extends over 2T. The sidelobes contribute only to smoothing the phase signal so as to minimize the spectrum occupied by the transmitted signal. It thus follows that the data conveyed by the sidelobes is practically zero, and they may be ignored during demodulation for which g(t) is taken as being of duration 2T. The principal function $F_p(t)$ thus has duration 3T as shown in FIG. 4.

Figure 5:
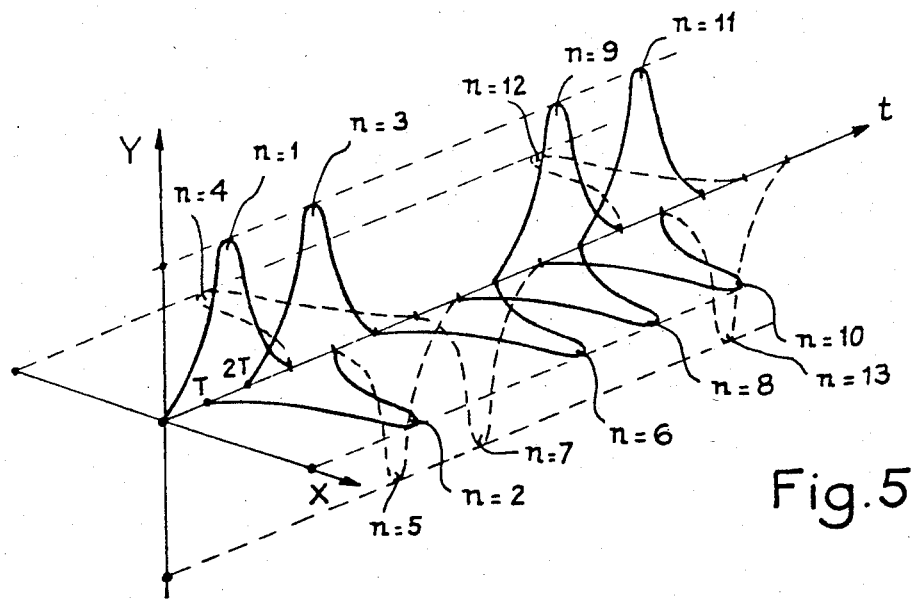
FIG. 5 is an example of a transmitted modulation signal shown in its approximate linear form.

FIG. 5 shows an example of a signal transmitted using SCR4 modulation. The signal is shown in baseband in the form of a linear approximation and with respect to three axes (X,Y,t), where X is the real axis, Y is the imaginary axis and t is time. Pulses $F_p(t-nT)$ for even n correspond to the real components and are shown in the plane XOt, while pulses $F_p(t-nT)$ for odd n correspond to the imaginary components and are shown in the plane YOt. The successive values of n are indicated in the figure adjacent to each corresponding pulse $F_p(t-nT)$.

The signal y(t) as received by the demodulator and transposed into baseband is the same as the signal shown in FIG. 5 plus the addition of noise n(t) of level $N_O$ in the signal band, and plus an arbitrary rotation of phase $\theta$ where:

$$y(t,a,\theta) = \text{Re}(x(t,a)\exp(j\theta) + n(t)).$$

The notation Re(x) means "the real part of x".

In order to demodulate, a demodulator in accordance with the invention filters the received signal with a filter matched to the function $F_p(t)$, i.e. filters using a filter having an impulse response equal to $F_p(-t)$.

Thus, the signal available after filtering is:

$$S(t) = \sum_n (j)^n b_n R_p(t - nT) + n'(t).$$

Where R(t) is the autocorrelation function of $F_p(t)$, and n'(t) is a time expression for the noise signal after filtering.

Where the demodulator is associated with a receiver which includes a bit synchronizing circuit, the signal after filtering is sampled at the bit rate in the middle of the intervals corresponding to transitions between bits. It is at these instants that the autocorrelation function is at a maximum.

It is also possible to do without bit synchronization external to the demodulator, as follows: the signal after filtering is sampled several times during each bit period, say 3 times. The demodulation process is then applied that number of times in parallel, and an optimum sampling stream is deduced by observing the behaviour of the metrics which are calculated during the demodulation process as described below.

Figure 6:
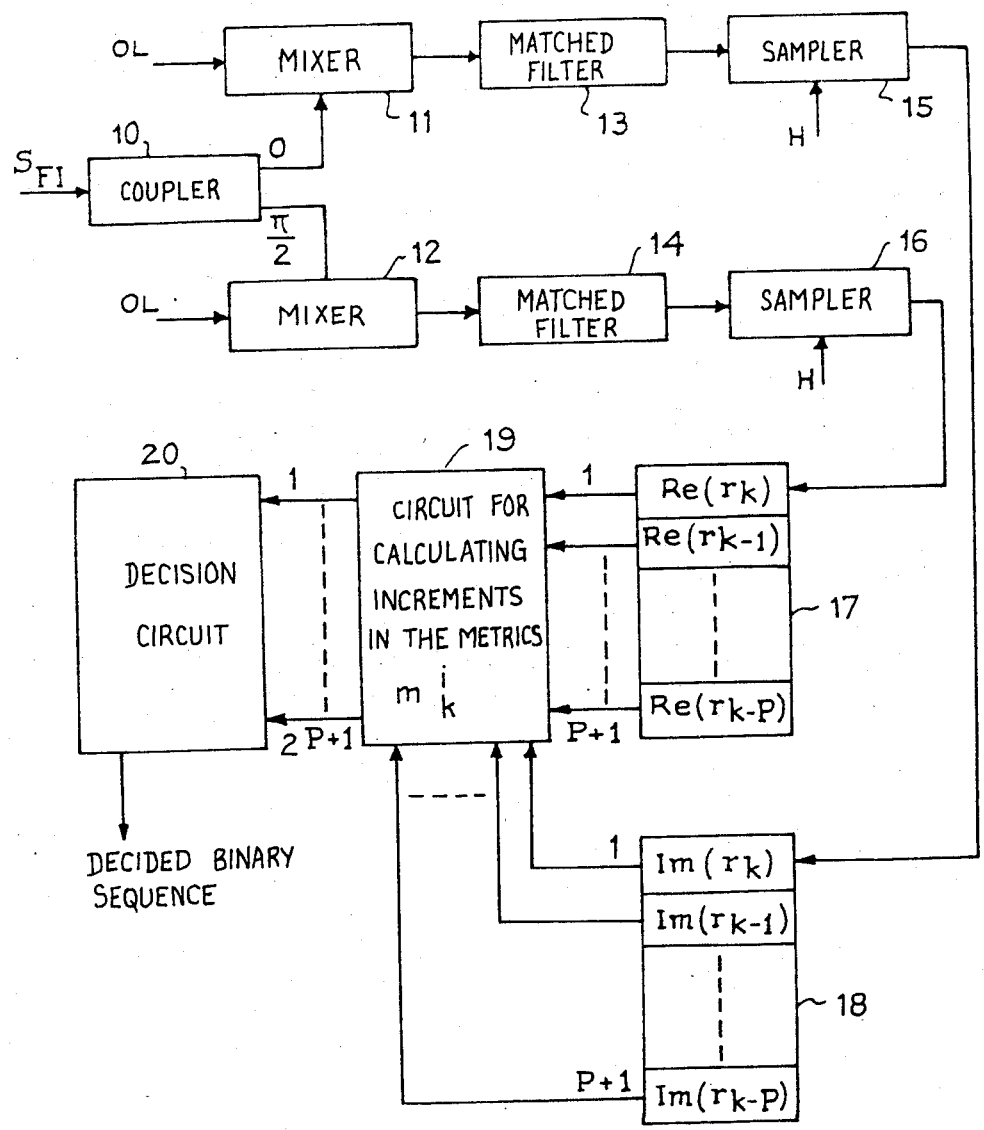
FIG. 6 is a block diagram of one embodiment of a demodulator in accordance with the invention.

FIG. 6 shows a demodulator in accordance with the invention, and it is constituted as follows.

The modulated carrier is received and is transposed to an intermediate frequency $S_{FI}$ which is then applied to the input of a 3 dB coupler 10 giving a phase shift of $\pi/2$. The coupler delivers output carriers in quadrature I and Q. The outputs from the coupler are connected to first inputs of first and second mixers 11 and 12 having respective second inputs connected to a local oscillation signal OL at the intermediate carrier frequency. The signals at the outputs from the mixers include respective baseband signals which constitute the modulation signal plus noise. These signals are applied to the inputs of two identical filters 13 and 14 which are matched to the principal function which corresponds to the type of modulation used at the transmitter, and as defined above. A filter matched to a function $F_p(t)$ is a filter having an impulse response $F_p(-t)$.

At high data rates, such filters are advantageously surface acoustic wave filters.

The two filter outputs are connected to the inputs of respective samplers 15 and 16, each of which has a control input receiving a clock signal H at the data bit rate. The clock signal H is provided by a bit synchronizing device not shown in the figure. The signals at the outputs from the matched filters are thus sampled once per bit period.

The outputs from the samplers 15 and 16 are connected to the inputs of respective FIFO (first-in, first-out) memory stacks 17 and 18 having P+1 stages each, where P is an integer greater than or equal to 1, but not too large in order to keep complexity within limits—say not greater than 5. This memory is used to store complex samples $r_k$ resulting from the sampling of two carriers in quadrature. At any given instant, the sampling process ensures that the first stack 17 stores the real parts of complex samples $\text{Re}(r_k) \ldots \text{Re}(r_{k-p})$ while the second stack 18 stores the corresponding imaginary parts $\text{Im}(r_k) \ldots \text{Im}(r_{k-p})$. At each instant, all the stages of the two part stack are accessible. The corresponding 2(P+1) outputs are connected to a calculator circuit 19. This circuit calculates the $2^{P+1}$ branch metrics associated for $1 < i < 2^{P+1}$ with the $2^{P+1}$ possible sequences of p+1 symbols $a_k \ldots a_{k-p}$, and defined as follows:

$$m_k^i = \sum_{q=1}^{q=P} a_k a_{k-q} \text{Re}(j^{-q} r_k r_{k-q}^*)$$

where $r^*_{k-q}$ is the complex conjugate sample of the sample $r_{k-q}$, and $\hat{a}_k$ and $\hat{a}_{k-q}$ indicate the binary symbols chosen as reference symbols for calculating the corresponding branch metric.

This calculation is performed by a suitably programmed microprocessor.

These $2^{P+1}$ branch metrics as calculated at each period are transmitted to a decision circuit 20 which performs a dynamic programming decision algorithm of the Viterbi type which has been widely described in the literature, e.g. in an article entitled The Viterbi Algorithm" which appeared in Proc. I.E.E.E. Vol. 61, pages 268 to 273 in March 1973.

This algorithm is organized around a trellis having $2^P$ states at each stage n, each of the $2^P$ states representing one of the $2^P$ possible sequences of the previous P bits.

The branch metrics associate a weight with each possible extension to the paths through the trellis at stage n. Since there are $2^P$ possible sequences at each stage, and since each of them may be followed by a 1 or by a 0, that means there are $2^{P+1}$ possible branch metrics, each leading to one of the $2^P$ states of stages (n+1). In other words, each state of stage (n+1) may be reached by extending two different paths from two different states of stage n.

For example, put P=2.

At each stage there are four possible states corresponding to sequences 00, 01, 10, 11, giving rise to a trellis of the following form:

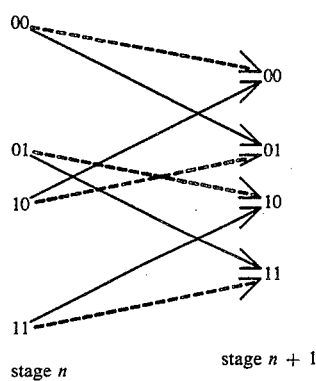

stage n    stage n + 1

The Viterbi algorithm consists in finding an optimum path through the trellis. At stage n there are $2^P$ previously determined optimum paths through the trellis: i.e. one optimum path to reach each of the $2^P$ states. These optimum paths are each represented by a single number which is the sum of the metrics of the branches making up the path so far. The optimum path to each state of the next stage is calculated by adding the $2^{P+1}$ current branch metrics to the appropriate ones of the $2^P$ optimum path totals so far, to obtain two possible path totals for each state in the next stage. The higher path total is then selected for each state to represent the optimum path to that state in stage n+1.

The invention is not limited to the specific embodiment of a demodulator which is shown and described. In particular, as already mentioned, external synchronization to the bit rate H is not essential: sampling could be performed at an integer multiple of the rate H and the same algorithm could be executed several times over in parallel. The sampling signal giving rise to the maximum metrics is then selected.

We claim:

1. A demodulator for constant envelope and continuous phase signals that are angle modulated by a train of binary symbols, wherein the complex envelope of the received signal is treated as a sequence of elementary pulses which are amplitude modulated by a principal function $F_p(t)$ and which are regularly phase shifted relative to one another, the principal function being associated with the pulse g(t) characteristic of the modulation used for transmission, the demodulator comprising a $\pi/2$ phase shifting coupler having an input connected to receive the received signal at an intermediate frequency, and two outputs, for decomposing the complex envelope of the received signal into two components in quadrature, two mixers having respective inputs connected to a respective output of the coupler, for translating the received signal components to base band, and having outputs, two filters both of which are matched to the principal function $F_p(t)$ and each having an input connected to the output from a respective one of the mixers and an output, two samplers having inputs respectively connected to the outputs of the filters, and outputs, two shift memories having input respectively connected to the outputs of the samplers, having P+1 stages each, said memories storing the real and the imaginary parts respectively of P+1 consecutive complex samples which are shifted at the data bit clock rate T, and each memory having outputs from the (P+1) stages, a calculation circuit having 2(P+1) inputs connected to the outputs of said memories for calculating branch metrics which are associated, at each clock pulse, with each of the $2^{P+1}$ possible sequences of (P+1) bits and having outputs, and a decision circuit connected to the outputs from the calculation circuit to perform a dynamic programming algorithm to decide at each clock pulse on the value of a binary digit by seeking the path for which the sum of the corresponding branch metrics is a maximum.

2. A demodulator according to claim 1, wherein the dynamic programming algorithm performed by the decision circuit is the Viterbi algorithm.

3. A demodulator according to claim 2, for demodulating signals which have been modulated in such a manner that the pulse which characterizes the modulation is $g(t)=(k.\sin\pi X)/(\pi.X.(1-X^2))$, where $X=2(t/\pi)-4$ over a duration $0<t<T$, and k is a normalization constant, wherein the filters are adapted to the corresponding principal function $F_p(t)$.

* * * * *